United States Patent Office 3,037,908
Patented June 5, 1962

3,037,908
AGRICULTURAL COMPOSITIONS AND METHOD FOR CONTROLLING PLANT-PARASITIC NEMATODES
Alfred Margot, Basel, Switzerland, assignor to J. R. Geigy A.-G., Basel, Switzerland
No Drawing. Filed Sept. 23, 1960, Ser. No. 57,896
Claims priority, application Switzerland Sept. 24, 1959
13 Claims. (Cl. 167—33)

The present invention is concerned with new agricultural compositions for controlling plant-parasitic nematodes, containing heterocyclic sulphides as active ingredients, and the use of these active heterocyclic sulphides and the compositions containing them in a process for controlling plant-parasitic nematodes.

Up to the present, only those active substances for controlling plant parasitic nematodes have attained practical importance which act either in the gas phase such as e.g. 1,2-dibromo-3-chloropropene and mixtures of dichloropropane and dichloropropene, or those which quickly decompose in the earth such as e.g. the sodium salt of monomethyldithiocarbamic acid or 3,5-dimethyl-tetrahydro-1,3,5-thiadiazine-2-thione.

The first group of active substances has the disadvantage that they have to be applied by injection into the earth which is therefore laborious and costly. The second group of active substances is not only instable after application but also on previous storing and some of them can only be stored as an aqueous solution of a definite concentration. In addition, because of their irritant action and their bad smell, for example, in greenhouses or near living quarters, it is barely possible to use such agents.

It has now surprisingly been found that heterocyclic sulphides of the formulae

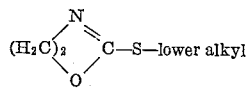

and

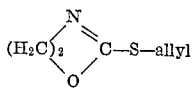

are excellently suitable as active substances for controlling plant-parasitic nematodes and, in addition, are free from the disadvantages mentioned above.

By the expression "lower alkyl" in the above formula of the active ingredients is meant radicals which contain from 1 to 4 carbon atoms, e.g. methyl, ethyl, n-propyl, isopropyl, n-butyl, tert. butyl, sec. butyl and isobutyl radicals.

Some of the compounds covered by the formulae above are known already; those not known up to now can easily be produced by methods known per se, for example, by reacting the corresponding mercaptans (—SH compounds) with suitable low molecular alkyl or alkenyl halides. The heterocyclic sulphides of the above formulae are generally oils which can be distilled. The following, for example, is suitable as nematocidal active substance: 2-ethylmercapto-Δ²-oxazoline.

The agents according to the invention for controlling nematodes can be emulsions, suspensions, dusts, sprinkling agents or solutions. The form of agent used depends on the intended application thereof which, in its turn, depends especially on the type of nematodes to be controlled, the plants to be protected, the climate and earth conditions as well as on the application technicalities. As even as possible a distribution of the active substances throughout a layer of earth about 15-25 cm. deep is generally advantageous, the amount of active substance required in this case being generally about 50–250 kg. per hectare. It is also possible, however, to make a particular application, for example, one limited to dibber holes or furrows and, sometimes, even a sufficient protective action is attained with a reduced amount of active substance.

Dusts and sprinkling agents are suitable in particular to fallow land before or at the same time as harrowing or mechanically preparing the ground, which process enables the agents to be finely distributed in the top earth layer. This mechanical process can be one ordinarily performed in the cultivation of the plant or it can be performed especially to distribute the agents, possibly together with synthetic fertilisers or soil conditioning agents. In addition, the agents can also be dusted or sprinkled, for example, in furrows in seed beds or in between growing plants.

Dusts can be produced on the one hand by mixing or milling together the active substance with a solid, pulverulent carrier which is insoluble in or difficultly soluble in water. As such can be used, e.g. talcum, diatomaceous earth, kieselguhr, kaolin, bentonite, calcium carbonate, boric acid or tricalcium phosphate. On the other hand, the substances can be drawn on to the carriers by means of a volatile solvent. To produce sprinkling agents, either coarsely granulated and/or specifically heavy carriers such as e.g. coarsely ground limestone or sand can be used, or also mixtures of active substances with possibly porous carriers which themselves are finely granulated, can be granulated.

In addition, sprinkling agents can contain as carriers in coarsely granulated form or even in larger granules, solid substances which are more soluble in water and citric acid, for example, synthetic manures such as calcium phosphates which have been made water soluble or other calcium, potassium or ammonium salts, phosphates or nitrates.

Emulsions, according to the invention, can be used both on fallow ground as well as, because of their penetration power, in existing cultivations. They can be produced by emulsifying the active substances as such or after dissolving them in organic solvents such as e.g. xylene, in water which contains a capillary active substance. For the application of emulsions, in practice it is generally advantageous first to produce concentrates by combining active substances with inert organic solvents and/or capillary active substances, which concentrates can be mono- or poly-phase, and then working these up to ready-for-use emulsions with water. As capillary active substances (emulsifying agents) can be used cation active substances such as e.g. quaternary ammonium salts, anion active substances such as salts of aliphatic long chain sulphuric acid monoesters, long chain alkoxyacetic acids and aliphatic-aromatic sulphonic acids, and non-ionogenic capillary active substances, e.g. polyethyleneglycol ethers of fatty alcohols or of dialkylphenols and polycondensation products of ethylene oxide. Cyclic hydrocarbons such as benzene, toluene, xylene, ketones, alcohols and other solvents such as ethyl acetate, dioxan acetone glycerine or diacetone alcohol are suitable, for example, as solvents in the production of emulsion concentrates.

Wettable powders suitable for suspension in water, so-called spray powders, can be produced by combining liquid active substances with solid pulverulent carriers and the capillary active substances mentioned above.

As solutions of the active substances according to the invention, in particular those in low boiling halogen-hydrocarbons which themselves have a nematocidal action are used, for example in 1,2-dibromo-3-chloropropane, in dichlorobutene or in mixtures of dichloropropane and dichloropropene, the transitory nematocidal action of which is supplemented in a valuable manner by the long-lasting action of the active substances according to the invention.

In the amounts necessary in practice, the active substances according to the invention have not a phytotoxic action so that there is no question of injurious influence on plant growth. If desired, however, the biological activity of the agents according to the invention can be supplemented by the addition of fungicidal, herbicidal or insecticidal or other nematocidal active substances.

In the following will be found first examples of the test methods used to determine the activity of the active substances and then a number of examples of typical forms of application are given.

*Example 1*

The active substances to be tested are worked up into emulsifiable solutions with polyhydroxyethylene sorbitan monooleate and acetone, these are emulsified in water and diluted to the concentration desired. The emulsions prepared are then poured into glass dishes of about 4 cm. diameter and, as test animals, *Panagrellus redivivus* (*a*) or *Ditylenchus dipsaci* (*b*) are added. The dishes are left standing at 19–21° C. and the action on Panagrellus is determined after 30 hours and on Ditylenchus after 50 hours.

*Example 2*

The amount of active substance necessary to attain the desired concentration is taken up in 20 ml. of washed, dry sand and this is then mixed with 2 litres of natural earth which has been infected with *Meloidogyne arenaria*. After leaving the earth for 7 days, it is distributed in three plantpots and two young tomato plants are set in each pot. After 9 weeks, the cysts formed on the roots of the plants are counted and the weight of the rhizome is determined.

*Example 3*

20 parts of active ingredient and 80 parts of talcum are milled to the greatest degree of fineness in a ball mill. The mixture obtained serves as a dust.

*Example 4*

20 parts of active ingredient are dissolved in a mixture of 48 parts of diacetone alcohol, 16 parts of xylene and 16 parts of an anhydrous, high molecular condensation product of ethylene oxide with higher fatty acids. This concentrate can be diluted with water to form emulsions of any concentration desired.

*Example 5*

80 parts of active ingredient are mixed with 2–4 parts of a wetting agent, e.g. a sulphuric acid ester of an alkyl polyglycol ether, 1–3 parts of a protective colloid, e.g. sulphite waste liquor, and 15 parts of an inert, solid carrier such as e.g. kaolin, bentonite, chalk or kieselguhr and the mixture is then finely milled in a suitable mill. The wettable powder obtained can be stirred with water and produces very stable suspensions.

*Example 6*

5 parts by weight of active ingredient are mixed and milled with 95 parts by weight of calcium carbonate (=ground limestone). The product can be used as a sprinkling agent.

*Example 7*

5 parts by weight of active ingredient, e.g. 2-ethyl-mercapto-$\Delta^2$-oxazoline are mixed with 95 parts of a pulverulent carrier, e.g. sand or calcium carbonate and the mixture is moistened with 1–5 parts by weight of water or isopropanol. The mixture is then granulated.

Before granulating, a great excess, e.g. 100–900 parts of a possibly water soluble synthetic fertiliser such as e.g. ammonium sulphate, can be mixed with the above mixture or with one containing more active ingredient, e.g. containing 10 parts of active ingredient and 90 parts of calcium carbonate.

What I claim is:

1. An agricultural composition for controlling plant-parasitic nematodes comprising as active ingredient a heterocyclic sulphide corresponding to the formula

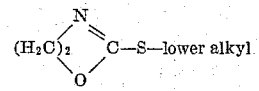

in an amount sufficient to control nematodes, and an agricultural carrier.

2. A composition conforming to claim 1 wherein the agricultural carrier is an inert solid carrier.

3. A composition conforming to claim 1 wherein the agricultural carrier contains a surface active agent.

4. A composition conforming to claim 1 wherein the agricultural carrier contains a low boiling halogenated hydrocarbon solvent having itself nematocidal activity.

5. An agricultural composition for controlling plant-parasitic nematodes comprising as active ingredient a heterocyclic sulphide corresponding to the formula

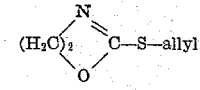

in an amount sufficient to control nematodes, and an agricultural carrier.

6. An agricultural composition for controlling plant-parasitic nematodes comprising as active ingredient 2-ethyl-mercapto-$\Delta^2$-oxazoline in an amount sufficient to control nematodes and an agricultural carrier.

7. A method of controlling plant-parasitic nematodes which comprises introducing into at least the surface layer of a soil serving for the cultivation of plants and in an amount sufficient to control nematodes, a heterocyclic sulphide corresponding to the formula

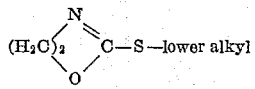

8. A method conforming to claim 7, in which the active heterocyclic sulphide is 2-ethylmercapto-$\Delta^2$-oxazoline.

9. A method according to claim 7 wherein the active substance is uniformly distributed throughout the surface layer of the soil to a depth of about 15 to 25 cm., the quantity of active substance being in the range of about 50 to 250 kg. per hectare.

10. A method of controlling plant-parasitic nematodes which comprises introducing into at least the surface layer of a soil serving for the cultivation of plants and in an amount sufficient to control nematodes, a heterocyclic sulphide corresponding to the formula

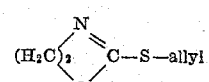

11. A method according to claim 10 wherein the active substance is uniformly distributed throughout the surface layer of the soil to a depth of about 15 to 25 cm., the quantity of active substance being in the range of about 50 to 250 kg. per hectare.

12. A method of controlling plant-parasitic nematodes which comprises introducing into at least the surface layer of a soil serving for the cultivation of plants, and in an amount and concentration sufficient to control nematodes, an agricultural composition comprising a heterocyclic sulphide of the formula

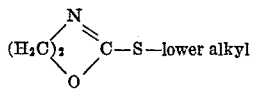

13. A method of controlling plant-parasitic nematodes which comprises introducing into at least the surface layer of a soil serving for the cultivation of plants, and in an amount and concentration sufficient to control nematodes, an agricultural composition comprising a heterocyclic sulphide of the formula

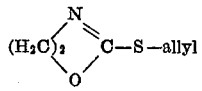

References Cited in the file of this patent

UNITED STATES PATENTS 2,516,313    Goddin et al. _____ July 25, 1950